United States Patent [19]
Suzuki et al.

[11] Patent Number: 5,144,885
[45] Date of Patent: Sep. 8, 1992

[54] CERAMIC-METAL FRICTION WELDING MEMBER AND CERAMIC CAST-IN BONDED PISTON MADE THEREOF

[75] Inventors: Tomio Suzuki, Yokkaichi; Hiroyuki Ohi, Nagoya, both of Japan

[73] Assignee: NGK Insulators, Ltd., Japan

[21] Appl. No.: 759,773

[22] Filed: Sep. 13, 1991

Related U.S. Application Data

[63] Continuation of Ser. No. 423,880, Oct. 19, 1989, abandoned.

[30] Foreign Application Priority Data

Oct. 25, 1988 [JP] Japan .................. 63-268818
Oct. 25, 1988 [JP] Japan .................. 63-268819

[51] Int. Cl.$^5$ .............................. F16J 1/04
[52] U.S. Cl. ...................... 92/222; 92/213; 92/231; 92/248
[58] Field of Search ............ 92/212, 213, 222, 248, 92/231

[56] References Cited

U.S. PATENT DOCUMENTS

| | | | |
|---|---|---|---|
| 4,506,593 | 3/1985 | Sugiyama et al. ............ | 92/212 |
| 4,592,268 | 6/1986 | Hartsock ..................... | 92/213 X |
| 4,648,308 | 3/1987 | Matsui et al. ................ | 92/212 |
| 4,741,253 | 5/1988 | Ogawa et al. ................ | 92/212 |
| 4,746,582 | 5/1988 | Tsuno ......................... | 92/212 X |

FOREIGN PATENT DOCUMENTS

| | | |
|---|---|---|
| 0111989 | 6/1984 | European Pat. Off. . |
| 3506069 | 9/1985 | Fed. Rep. of Germany . |
| 3626009 | 2/1987 | Fed. Rep. of Germany . |
| 62-200147 | 12/1987 | Japan . |

OTHER PUBLICATIONS

Patent Abstracts of Japan, vol. 3, No. 46 (C-43) Apr. 18, 1979.

*Primary Examiner*—Allen M. Ostrager
*Attorney, Agent, or Firm*—Parkhurst, Wendel & Rossi

[57] ABSTRACT

A ceramic-metal friction welded member includes a ceramic member formed with an annular notch in an outer circumference of its surface and a metal member joined onto the annular notch of the ceramic member by friction welding. A ceramic cast-in bonded piston includes a crown made of a ceramic material having an annular notch formed in an outer circumference of its surface, a metal annular member joined onto the annular notch of the crown by friction welding, and a piston main body made of an aluminum alloy surrounding the crown by cast-in bonding. A ceramic cast-in bonded piston includes a crown made of a ceramic material, a piston main body made of an aluminum alloy surrounding the crown by cast-in bonding, and an annular member made of a metal different from aluminum and joined by friction welding to an outer circumference of a surface of the crown in contact with the piston main body.

2 Claims, 9 Drawing Sheets

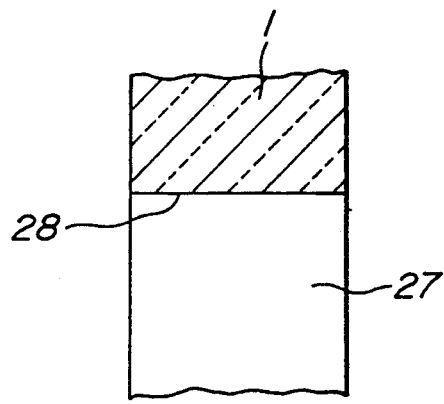
FIG_1
PRIOR ART

FIG_2
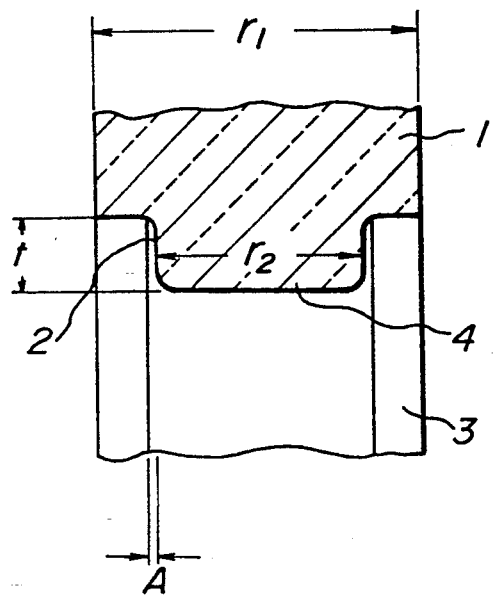
FIG_3
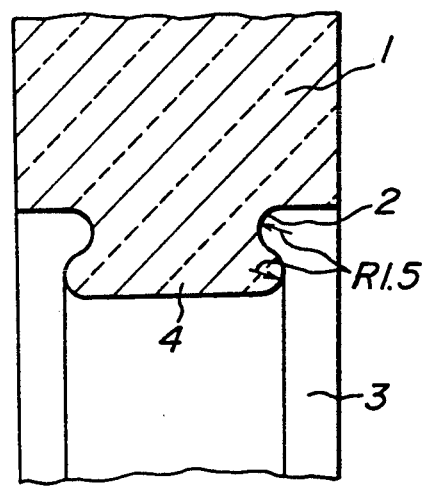

FIG_4a
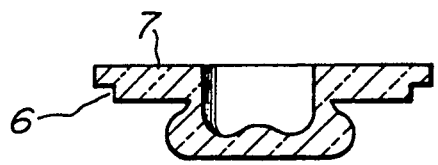
FIG_4b
FIG_4c
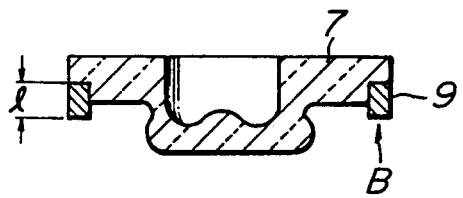
FIG_4d
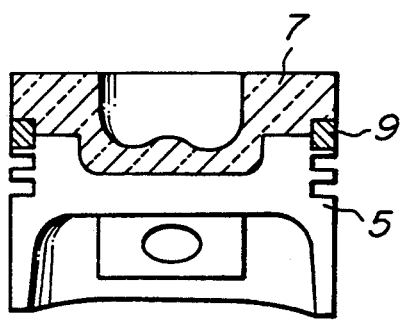

FIG_5a
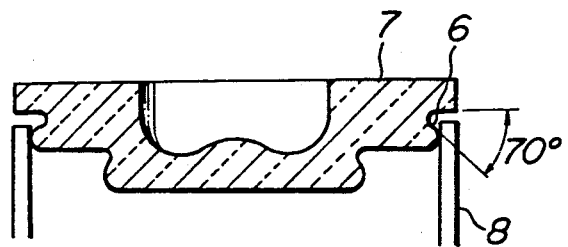
FIG_5b
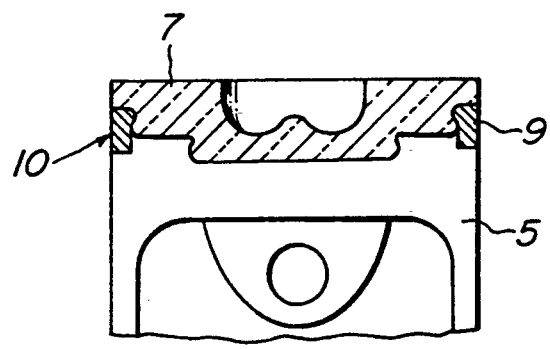

FIG_6a
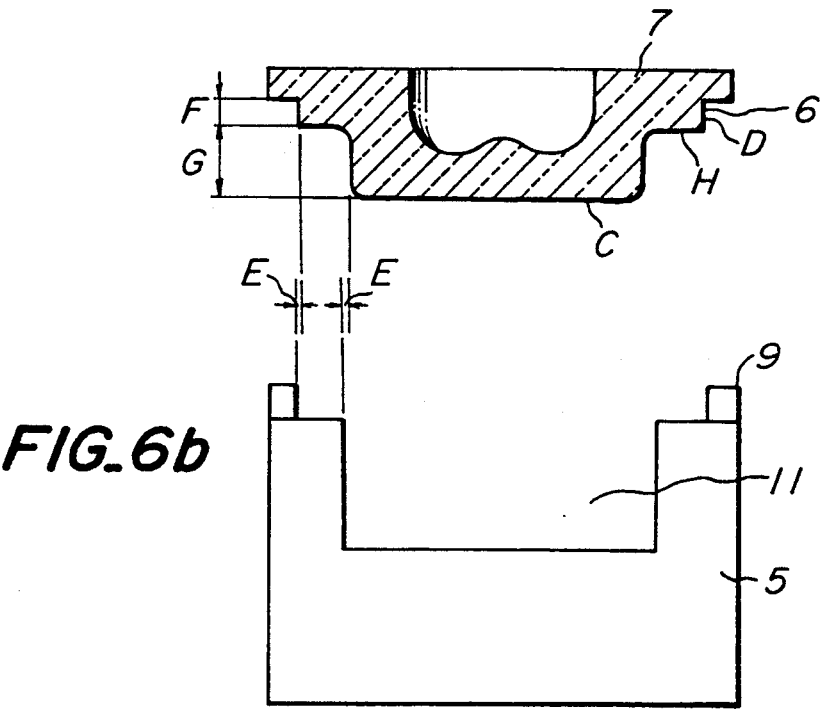
FIG_6b
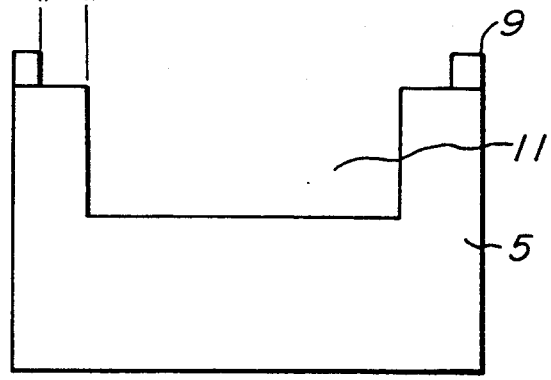
FIG_6c
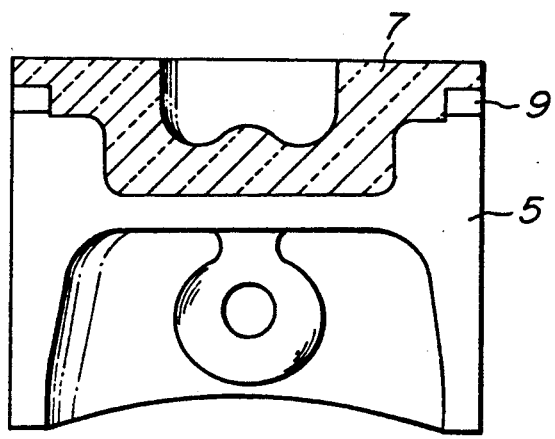

FIG_7
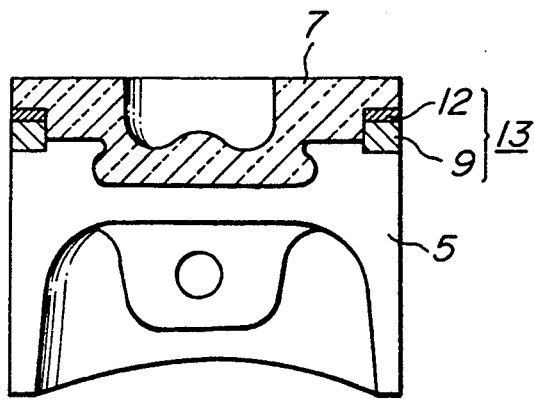
FIG_8
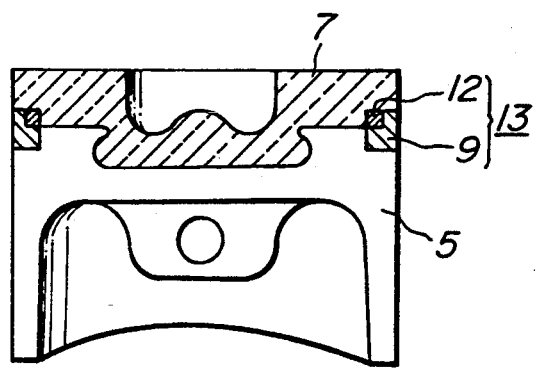

FIG_9
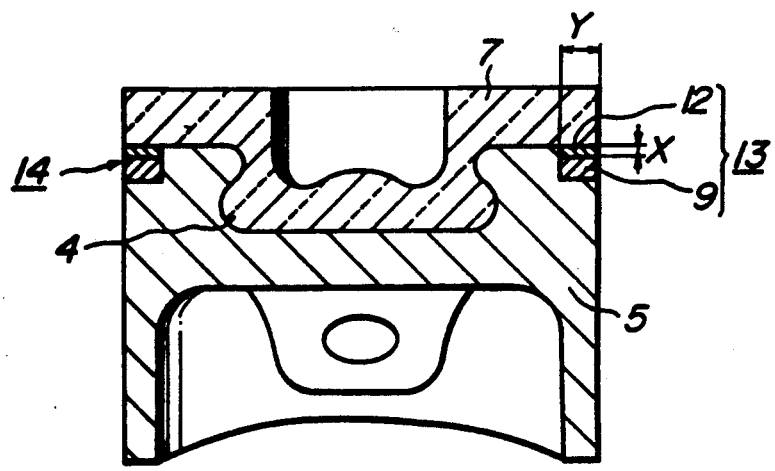
FIG_10
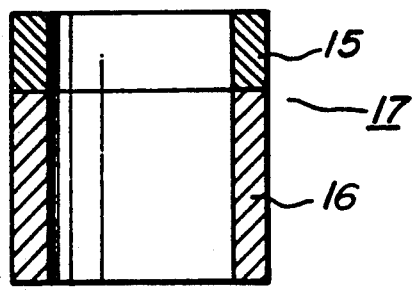

FIG_11
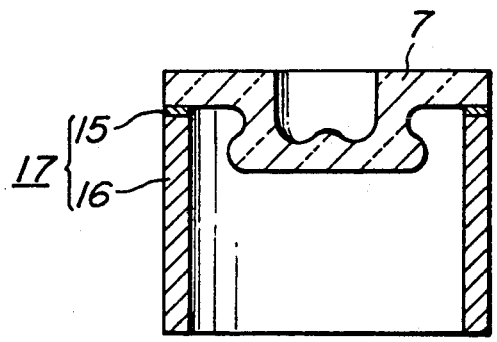
FIG_12
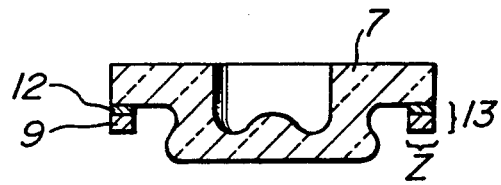
FIG_13
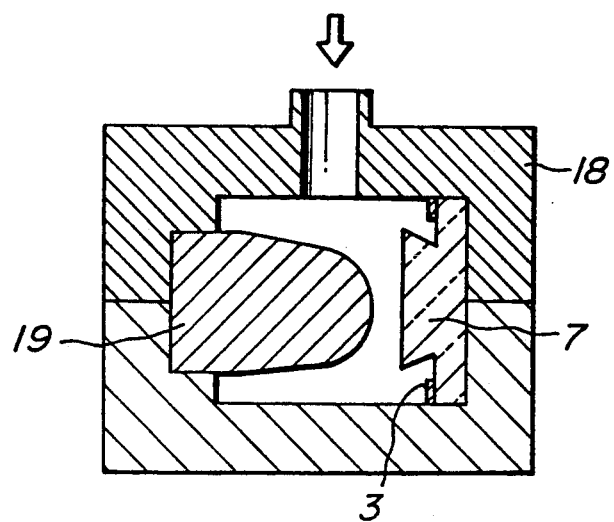

CERAMIC-METAL FRICTION WELDING MEMBER AND CERAMIC CAST-IN BONDED PISTON MADE THEREOF

This is a continuation of application Ser. No. 07/423,880 filed Oct. 19, 1989, now abandoned.

BACKGROUND OF THE INVENTION

This invention relates to a ceramic-metal friction welding member and a ceramic cast-in bonded piston made thereof which are useful for heat-resistant and wear-resistant parts to be used in engines and other industrial machines.

Recently, for example, with a piston for an internal combustion engine, in order to improve heat-resistance and wear-resistance, as well as decrease the weight of the engine itself, a piston made of a ceramic material and a metal integrally joined by cast-in bonding has been proposed and is actually being used.

Ceramic joined pistons made of integrally joined ceramic and metal members by cast-in bonding have been known as disclosed in, for example, Japanese Patent Laid-open No. 59-101,566 and Japanese Utility Model Laid-open No. 62-200,147.

The ceramic joined piston disclosed in the Japanese Patent Laid-open No. 59-101,566 is made of a ceramic member and a metal member being integrally joined by cast-in bonding through a metallized layer coated on a surface of the ceramic member and a cushioning material joined to the metallized layer.

Moreover, the ceramic joined piston disclosed in the Japanese Utility Model Laid-open No. 62-200,147 includes a ceramic member provided in a piston cavity and having an outer circumference which is formed with a groove or taper diverging from an upper end to a bottom end of a piston, thereby preventing any dislodgment of the ceramic member. In order to improve the bonding to an aluminum alloy, moreover, this publication discloses a feature of metallizing the outer circumference of the ceramic member.

With the ceramic joined piston disclosed in the Japanese Patent Laid-open No. 59-101,566, however, the joining force between the piston main body and the ceramic member is enhanced by a bond force of the metallized layer. Therefore, the metallized layers are formed in wide areas in order to endure stresses due to inertia forces, thermal deformations, and the like, of the piston. However, it is technically difficult to form the metallized layers uniformly in the wide areas, and as such tends to increase the manufacturing cost. Moreover, as the inertia forces and the thermal deformations are supported only by the metallized layers, reliability in strength is insufficient. In fact, joined surfaces often peel in operation of the piston so that burnt gases enter the peeled portions, with the result that the combustion efficiency of the engine will be lowered and fuel consumption will be increased. Moreover, such an entrance of the burnt gases would cause damage to the piston material and accumulation of carbon particles therein.

On the other hand, the ceramic joined piston disclosed in the Japanese Utility Model Laid-open No. 62-200,147 includes a ceramic member having an outer circumference formed with a groove or taper to prevent dislodgment of the ceramic member. Any sealing for preventing burnt gases from entering the joining surfaces is not considered. This is clear from the fact that in the embodiment of FIG. 5 in the Japanese Utility Model Laid-open No. 62-200,147, surfaces of the piston to be joined to the ceramic member are not subjected to any treatment.

SUMMARY OF THE INVENTION

It is an object of the invention to provide an improved ceramic-metal friction welded member and a ceramic cast-in bonded piston made thereof which eliminate all the disadvantages of the prior art.

In order to accomplish the object, a ceramic-metal friction welded member including a ceramic member and a metal member according to the invention comprises an annular notch on an outer circumference of a surface of the ceramic member to be joined to the metal member, on which annular notch is joined the metal member by friction welding.

In a first ceramic cast-in bonded piston including a crown made of a ceramic material and a piston main body made of an aluminum alloy surrounding the crown by cast-in bonding, according to the invention the crown comprises an annular notch formed in an outer circumference of its surface to be in contact with the piston main body, on which annular notch is joined a metal annular member by friction welding.

In a second ceramic cast-in bonded piston including a crown made of a ceramic material and a piston main body made of an aluminum alloy surrounding the crown by cast-in bonding, according to the invention the crown comprises an annular member made of a metal different from the aluminum member joined by friction welding to an outer circumference of a surface of the crown to be in contact with the piston main body.

The ceramic-metal friction welded member according to the invention is particularly preferable for producing a product including a metal member which is difficult to be directly joined to the ceramic member by friction welding.

Moreover, by interposing an aluminum member between a ceramic member and a metal member which is difficult to be directly joined to the ceramic member, a ceramic-metal friction welded member having a high bond strength can be obtained.

The ceramic-metal friction welded member according to the invention is applicable to a ceramic cast-in bonded piston as above described and is applicable to an engine valve made of a metal member 20 and ceramic member 21 (FIGS. 14a and 14b). Moreover, the ceramic-metal friction welded member according to the invention is also applicable to members having ceramic members 21 joined by friction welding to a rocker arm 24 for transmitting power for operating engine valves, push rods 25 and sliding portions of a tappet 26 (FIG. 14c), and to corrosion-resistant and heat-resistant equipment of industrial machines, for example, ceramic spindles, ceramic rotors and the like of oxide-resistant pumps.

Moreover, the ceramic cast-in bonded piston is classified as two types as above described. The first ceramic cast-in bonded piston has an annular notch in its outer circumference, to which notch is joined are annular member. In the second ceramic cast-in bonded piston, an annular member of a metal different from aluminum is joined to an outer circumference of a crown by friction welding.

In the second ceramic cast-in bonded piston, the ceramic crown and the aluminum alloy piston main body are indirectly joined through the annular member, and joining surfaces between the ceramic crown and the piston main body respectively and the annular member are sealed so that sealing is very effective. Moreover, in addition to sealing the joining surfaces between the ceramic crown and the piston main body by means of the annular member, the ceramic crown is strongly joined to the aluminum alloy with a protrusion of the lower portion of the crown by shrinkage force caused in solidification during cooling process in aluminum alloy cast-in bonding.

The "friction welding" used herein is a joining method wherein after members to be joined are brought into contact with each other, one is moved relative to the other at contacting surfaces under a constant pressure to produce frictional heat, by which the contacting surfaces are heated to a high temperature, and metal material is caused to flow plastically by friction force and applied pressure, while both the materials are diffused into each other to join the members. Although this method has a limitation concerning configurations and sizes of the members to be joined, it has merits which other methods do not have. Particularly, the friction welding is very effective for joining members of different materials.

Ceramic materials superior in heat-resistance, thermal shock-resistance, adiabatic property and light weight are preferably used for the invention. The ceramic member used in the invention is preferably one selected from the group consisting of silicon nitride, silicon carbide, sialon, zirconia, mullite and alumina.

Roughnesses of the ceramic members to be welded by friction welding are preferably 0.05-1.0 μmRa. In the case that a flatness of the surface is controlled, a fired surface may be acceptable.

In the first ceramic cast-in piston according to the invention, as a metal member to be used for friction welding with the ceramic member, a metal possible to be directly joined to a ceramic material by friction welding is effective, for example, Ag, Cu, Ti, Nb, Mo, W, Ni, Fe, Inconel, Incolloy and the like. Other metals such as aluminum possible to be directly joined to ceramics by friction welding may of course be used. In this case, a friction-welded body more reliable in bond strength can be obtained.

With respect to the shape of the annular notch formed in the outer circumference of the ceramic member, a thickness in circumferential directions is preferably not more than 20% of a diameter of the ceramic member, more preferably not more than 10% and more particularly somewhat less than, for example not more than 1% of an inner diameter of a metal annular member. A height t of the protrusion 4 formed by the annular notch (FIG. 2) should be determined in consideration of stresses required of the joined surfaces. The value t is preferably 3-10 mm for parts such as pistons subjected to the influence of heating.

With the annular member used in the ceramic cast-in member according to the invention, the thickness (one half of difference of inner and outer diameters) in the circumferential direction is not particularly limited. However, it is preferably not more than 20% of the diameter of the ceramic member, more preferably not more than 10% for the reason that temperature distribution becomes uniform to produce less thermal stresses.

In the first ceramic cast-in bonded piston according to the invention, the ceramic crown is formed with an annular notch in an outer circumference of its surface to be in contact with the piston main body, to which annular notch is joined a metal annular member by friction welding and thereafter the crown is surrounded by the aluminum alloy by cast-in bonding.

In the second ceramic cast-in bonded piston according to the invention, the ceramic crown is provided with an annular member made of a metal different from aluminum welded thereto by friction welding and then the crown is surrounded by cast-in bonding to seal between the piston main body and the crown.

As the metal different from aluminum, any one metal can be used such as titanium, cast iron, carbon steel, copper, stainless steels, aluminum alloys and nickel alloys. In view of heat-resistance and corrosion-resistance, titanium is preferable.

In case of using the titanium, the annular member of titanium is joined to the aluminum by friction welding and then the aluminum of the joined member is joined to the ceramic member by friction welding.

By using the friction welding in this manner without requiring complicated operations such as metallizing, the manufacturing cost is lowered and products are advantageously produced in mass-production.

The material of the annular member is preferably an aluminum alloy other than aluminum alloy die cast. In case of requiring stable bond strength, a high purity aluminum alloy is preferably used. Although any width and thickness are not limited, the width X shown in FIG. 9 is preferably 0.2-2 mm, and the thickness Y is preferably not more than 10 mm. For example, if the thickness is 0.4 mm, a tensile strength not less than 13 kg/mm$^2$ is preferably obtained at room temperature.

With the second ceramic cast-in bonded piston, in case that an annular member long in an axial direction and formed with a top ring groove in an outer circumference is used, the burnt gas is sealed by the top ring so that the annular member does not have to be joined to an aluminum alloy. Therefore, the processes for joining are advantageously eliminated to lower the manufacturing cost. Moreover, as the annular member and the aluminum alloy piston main body are not joined, the thermal expansion of the aluminum alloy does not adversely affect the joining surfaces between the ceramic material and the annular member so that the reliability of the joining surfaces is improved.

In the event that the annular member is made of Niresist iron, it is also possible to form a top ring groove in the Niresist iron.

In the second ceramic cast-in bonded piston, before cast-in bonding, surfaces of the friction welded annular member may be surface-treated so as to make possible joining with a molten aluminum alloy or if the annular member and the aluminum alloy are possible to be welded, after cast-in bonding without any surface treatment, the annular member and the aluminum alloy may be welded. In this case, electron beam welding is preferably used because of its less thermal influence onto the surroundings.

In order that the invention may be more clearly understood, preferred embodiments will be described, by way of example, with reference to the accompanying drawings.

BRIEF DESCRIPTION OF THE DRAWINGS

FIG. 1 is an explanatory view of a friction welded construction of the prior art;

FIGS. 2 and 3 are schematic sectional views illustrating embodiments of ceramic-metal friction welded members according to the invention, respectively;

FIGS. 4a, 4b, 4c and 4d and 5a and 5b are schematic sectional views illustrating embodiments of applications of the friction welded members to ceramic pistons according to the invention;

FIGS. 6a, 6b and 6c and 7 and 8 are schematic sectional views illustrating other embodiments of applications of the invention to ceramic pistons;

FIG. 9 is a schematic sectional view illustrating one embodiment of a ceramic cast-in piston according to the invention;

FIGS. 10, 11, 12 and 13 are explanatory views illustrating one example of methods of producing the piston according to the invention;

EXPLANATION OF THE PREFERRED EMBODIMENTS

Figure 14A:
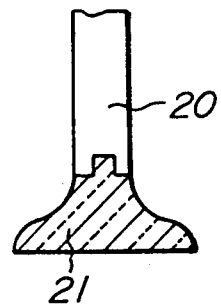
FIGS. 14a and 14b are schematic views illustrating an engine valve as an application of the invention.
Figure 14B:
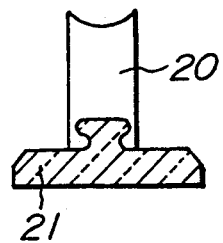
Figure 14C:
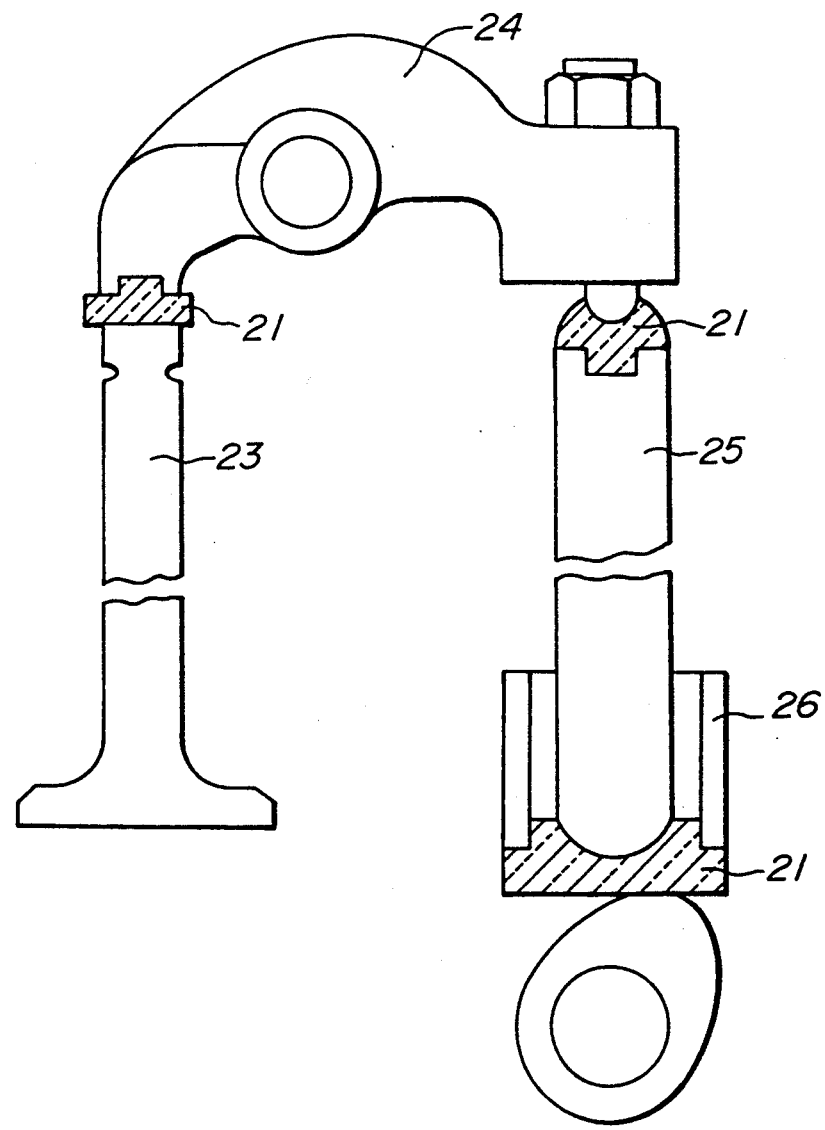
FIG. 14c is a schematic view illustrating a rocker arm as an application of the invention.

FIG. 2 schematically illustrates one embodiment of a ceramic-metal friction welded member according to the invention.

The friction welded member consists of a ceramic member 1 of silicon nitride and a metal annular member 3 of titanium. The ceramic member 1 is formed with an annular notch 2 on its outer circumference to be in opposition to the metal annular member 3. The metal annular member 3 is joined to the annular notch of the ceramic member 1 by means of friction welding. In the joining the ceramic member 1 and the metal annular member 3, there are previously provided clearances A therebetween so that softened part of the metal annular member 3 plastically flows into the clearances A to restrain or clamp a protrusion 4 of the ceramic member 1 by means of thermal shrinkage fit or press-fitting action. In this case the value of the clearances A is preferably determined by assuming that one third of the softened volume of the metal annular member 3 flows into the clearance A in friction welding. For example, particularly good result can be obtained when the total of the clearances A is 0.2 mm to 1 mm.

FIG. 3 is a schematic sectional view illustrating another embodiment of the ceramic-metal friction welded member according to the invention. Different from the column-shaped protrusion 4 of the ceramic member 1 in the embodiment shown in FIG. 2, a protrusion 4 of a ceramic member 1 has at its bottom a reduced diameter portion concaved with a curvature of R=1.5 mm. With this arrangement, the softened metal in friction welding plastically flows into the concaved portion to ensure prevention of dislodgement of the metal annular member 3 from the ceramic member 1 in a more reliable manner.

A tensile test was effected at room temperature for testing tensile strength of the ceramic and metal friction welded members. In the test, ceramic and metal friction welded members were prepared which had dimensions of $r_1 = 20$ mm, $r_2 = 14$ mm and $t = 5$ mm (FIG. 2). With the welded members as shown in FIG. 2, dislodgments occurred at a load of 1,700 kg, while with the members as shown in FIG. 3, dislodgments occurred at a load of 2,800 kg.

As can be seen from the above explanation, although with the hitherto used ceramic and metal joined constructions having no notch in ceramic members it is impossible to join a ceramic member to metal members other than aluminum, it becomes possible to join a ceramic member to metal members other than aluminum with the aid of the annular notch formed in the ceramic member according to the invention.

Moreover, it is preferable that the friction welded member is subjected to an annealing treatment within a temperature range to be used.

It is furthermore preferable that the friction welding is effected in an inert gas or vacuum because it can effectively prevent any oxidation thus mitigating any destruction of the ceramic due to its brittleness.

A second embodiment of the ceramic cast-in bonded piston will be explained hereinafter by referring to FIG. 9.

A ceramic crown 7 forming a top end of the piston in its entirety is cast-in bonded by an aluminum alloy member forming a piston main body. The piston main body 5 and the ceramic crown 7 are joined by a force acting upon the protrusion 4 formed at a lower portion of the crown 7 owing to shrinkage of the aluminum alloy in cast-in bonding. Moreover, an annular member 13 is provided in the proximity of a top land 14 at an outer circumference between the ceramic crown 7 and the piston main body 5. The annular member 13 serves to prevent burnt gases from entering a boundary of the ceramic crown 7 and the piston main body 5.

Before cast-in bonding, an aluminum ring 12 and a titanium ring 9 are joined by friction welding to form an annular member 13 integrally formed of aluminum and titanium. This composite member 13 is then attached by friction welding to a surface of the crown member 7 at its outer circumference to be in opposition to the piston main body. Thereafter, the composite member 13 is joined to the aluminum alloy.

Concrete examples of the first and second embodiment of the ceramic cast-in bonded piston according to the invention will be explained hereinafter.

EXAMPLE 1

Crowns 7 made of silicon nitride having an outer diameter of 90 mm were prepared, which was formed with an annular notch 6 having a width of 3 mm and a depth of 3 mm in an outer circumference on a surface to be in opposition to a piston main body 5 as shown in FIGS. 4a and 4b.

A titanium hollow cylinder 8 was then made, which had an inner diameter of 80 mm, an outer diameter of 90 mm and an axial length of 50 mm as shown in FIG. 4b. Then the crown 7 was fixed and the titanium hollow cylinder 8 was arranged in alignment with the crown 7 and rotated at a rotating speed of 800 rpm relative to the crown 7. The cylinder 8 was urged against the crown 7 with progressively increasing pressure to a maximum 3 kg/mm² so that they were friction welded to obtain a ceramic and metal bonded member.

Thereafter, the titanium hollow cylinder 8 of the bonded member was worked on its outer circumference to obtain a titanium ring 9 having an axial length l of 4 mm as shown in FIG. 4c. A surface of the ring 9 was then treated by alfin treatment (or alumelt treatment). The thus obtained silicon nitride crown 7 having the ring 9 was arranged in a sand mold into which molten aluminum alloy was poured at about 700° C. to obtain a ceramic cast-in bonded body. The body was annealed at a temperature near to that at which the piston is used. The body was machined to finish outer circumferences, annular grooves, piston pin holes and the like to complete a ceramic cast-in piston sealed by the titanium ring (FIG. 4d).

Although the metal member used for friction welding with the silicon nitride has been explained, it may be inexpensive cast iron for obtaining the similar performance and effect.

EXAMPLE 2

A silicon nitride crown 7 had a notch 6 having an angle of 70° as shown in FIG. 5a. Other constructions and producing processes were similar to those in Example 1. A thus obtained ceramic cast-in piston sealed by a titanium ring 9 was shown in FIG. 5b. Then joining surfaces 10 between the titanium ring 9 and piston main body 5 were welded by laser beams or electron beams.

In this Example, the notch 6 of the silicon nitride crown 7 had an inclined surface merging with a round bottom of the annular notch. Softened titanium in friction welding flowed into the bottom of the annular notch to enhance the prevention of dislodgment of the members. Moreover, as the joining surfaces 10 were welded by the laser beams or electron beams, firm joining between the titanium ring 9 and the piston main body 5 was obtained to produce a high performance ceramic cast-in piston. Joining surfaces of the titanium ring 9 facing to the aluminum alloy may be subjected to alfin or alumelt treatment to join with the aluminum alloy.

EXAMPLE 3

A silicon nitride crown 7 having an annular notch as shown in FIG. 6a was produced substantially in the same manner as in Example 1 with exception of sintered surfaces of the crown 7.

In order to mitigate stresses caused by joining the aluminum alloy piston main body 5 and the silicon nitride crown 7, the piston main body was formed in its center with a deep hole 11 as shown in FIG. 6b. A depth of the deep hole 11 was 7–10 mm deeper than a height G of a protrusion of the silicon nitride crown 7 in order to avoid an abutment of a bottom surface C of the protrusion against the bottom of the deep hole 11.

The piston main body 5 was then welded to a titanium ring 9 by means of friction welding. Thereafter, the titanium ring 9 on the piston main body 5 was worked so that its extending length became equal to a depth F of the annular notch on the outer circumference of the silicon nitride crown 7. A contacting surface of the aluminum alloy piston main body 5 to be in contact with a side surface of the silicon nitride crown 7 was worked to form clearances E of 0.2–1 mm. Thereafter, the crown 7 and the piston main body 5 integral with the titanium ring 9 were welded by friction welding as shown in FIG. 6c. In this case, the C portion of the crown 7 was fixed to the piston main body 5 by means of thermal shrinkage effect thereof. Moreover, the silicon nitride and aluminum alloy were friction-welded and the titanium ring 9 was softened by frictional heat with the crown 7 and fixed into the notch 6 of the crown 7 to improve the sealing effect at the portion D in conjunction with the thermal shrinkage fitting.

Thereafter, the thus joined body was machined to obtain a ceramic piston sealed by the titanium ring 9 as shown in FIG. 6c.

EXAMPLE 4

A ceramic cast-in bonded piston as shown in FIG. 7 was produced which was similar to that of Example 1 with exception that instead of the titanium ring 9, an annular member 13 consisting of an aluminum ring 12 and a titanium annular member 9 was used and the aluminum ring 12 was positioned on the side of the crown 7. This piston included the aluminum ring 12 between the ceramic crown 7 and titanium ring 9. However, as the ceramic and the aluminum were highly bonded, the ceramic piston having higher bond strength could be obtained. It was better for the aluminum ring 12 to use an aluminum of higher impurity. In this Example, A 1050 (JIS) whose aluminum purity was 99.5% was used. Although the ring 9 has been explained made of titanium in the Example, it may be cast iron, particularly preferably Niresist cast iron generally used as piston ring carriers.

EXAMPLE 5

A ceramic piston was produced, which was similar to that of Example 4 with the exception that an annular member 13 consisting of a titanium ring 9 and an aluminum ring 12 positioned on an inner circumference of the titanium ring 9 as shown in FIG. 8. Different from the piston of Example 4, this piston included the aluminum member which did not expose to burnt gases because it was covered by titanium, thereby improving corrosion-resistance. Moreover, as aluminum was interposed between titanium and ceramic, it provided a high performance ceramic piston having high bond strength.

EXAMPLE 6

An aluminum ring 15 having an inner diameter of 84 mm, and outer diameter of 90 mm and a length of 10 mm and a titanium ring 16 having an inner diameter of 84 mm, an outer diameter of 90 mm and a length of 60 mm were produced as shown in FIG. 10. The titanium ring 16 was fixed, on the other hand the aluminum ring 15 was rotated at a speed of 800 rpm relative to and urged against the titanium ring 16 with progressively increasing pressure to the maximum 6 kgf/mm$^2$ to obtain an aluminum-titanium joined ring (Al-Ti ring) 17. In this case, the titanium ring 16 may be fixed and the aluminum ring 15 may be rotated for friction welding. As an alternative both the rings may be rotated relatively to each other in reverse directions. In this Example, an aluminum A 1050 (JIS) and a titanium second class 35 (JIS) were used for the materials for the annular members.

Thereafter, as shown in FIG. 11, a silicon nitride crown 17 having an outer diameter 90 mm was fixed, while the Al-Ti ring 17 having an aluminum length of 10 mm was rotated at a speed of 800 rpm and urged against the crown 17 with increasing pressure to the maximum 3 kgf/mm$^2$ to friction-weld the crown 17 and Al-Ti ring 17 having the aluminum ring 15 of a thickness of 0.2–2 mm. In this case, the crown 7 may be rotated, while the Al-Ti ring 17 may be fixed, or both the rings may be rotated relative to each other in reverse directions. However, in fact it is better to fix the crown 7 and rotate the Al-Ti ring 17.

After friction welding, the Al-Ti ring 17 was worked to a desired length in an axial direction of the piston to obtain an annular member 13. An axial length of the annular member 13 was specified by top ring grooves to be formed in the aluminum ring 15. In the example shown in FIG. 12, the annular member 13 had an axial length of 4 mm.

A surface treatment was then applied to a surface of the annular member 13 to be in contact with the aluminum ring so that the surface reacted with the aluminum alloy when friction welding.

Although the surfaces of the annular member 13 were subjected to the alumelt treatment, the alfin treatment may be used. So long as the annular member 13 can be joined to an aluminum alloy and difference in thermal expansion therebetween is so small as not to cause peeling therebetween, other surface treatments may be used.

Thereafter, the silicon nitride crown 7 provided with the annular member 13 was arranged in a sand mold 18 as shown in FIG. 13. After pre-heating the sand mold 18 at 200° C., aluminum alloy molten metal AC8B heated at 700° C. was poured into the sand mold 18. After about 30 minutes, the sand mold 18 was broken to take out a ceramic cast-in bonded body from the mold. The mold 18 was a mold generally used as a sand mold. The casting was effected by gravity casting to obtain a cast-in bonded product. Reference numeral 19 denotes a core for the mold.

After cast-in bonding, outer circumferences, grooves for piston rings, holes for piston pins and the like were worked in finishing working to produce a ceramic cast-in bonded piston.

In order to ascertain the friction cast-in bond strength at the friction welded portion of the piston, a tensile test was carried out in an atmosphere at 400° C. As a result, the tensile strength was more than 8 kg/mm$^2$ and the bonded performance between the piston main body 5 and the ceramic crown 7 was good so that no peeling at the bonded portion occurred.

As can be seen from the above description, the following effects ca be accomplished according to the invention.

According to the invention, in joining a ceramic member and a metal member, the ceramic member is formed in its outer circumference with a notch to which the metal member is joined by means of the friction welding to have a thermal shrinkage fit and a press-fitting performance. The restraining force will be determined by the thermal expansion coefficient of the metal when it is softened by frictional heat. Therefore, the restraining force becomes high to obtain high bond strength. In comparison with the hitherto used thermal shrinkage fitting and press-fitting, no complicated operations are needed so that cost for producing can be lowered. Therefore, the piston according to the invention is suitable for mass-production.

According to the invention, even a metal member difficult in direct bonding with a ceramic material can be joined to the ceramic material as a friction welded body having a high bond strength. Moreover, by interposing an aluminum member between a ceramic member and a metal member according to the invention, a friction welded body can be provided, which is joined with a higher bond strength. By providing the annular notch in the crown according to the invention reliable joining can be obtained with the aid of thermal shrinkage fitting and press-fitting action. According to the invention high machining accuracy for parts to be joined is not needed and complicated operations such as metallizing are not needed so that cost for producing can be lowered and mass-production can be effectively employed.

As the ceramic crown is provided with an annular member different from aluminum and bonded by friction welding on an outer circumference of the crown to be in contact with a piston main body according to the invention, any burnt gases are prevented from entering between the piston main body and the crown, and the boundary therebetween does not peel even in continuous operation. Moreover, with the arrangement of the annular member, by using the aluminum ring having an axial thickness X of less than 2 mm, it is possible to mitigate the plastic deformation effect caused by slip in aluminum crystal when any tensile forces act thereon to ensure higher tensile forces at the joined surfaces.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A ceramic cast-in bonded piston, comprising:
   a ceramic crown comprising a top surface, a bottom surface, and an annular notch formed in an outermost side peripheral surface thereof;
   an aluminum alloy piston main body cast-in bonded in contact with said bottom surface of said ceramic crown; and
   at least one metal annular member friction welded in said annular notch of said ceramic crown to seal an interface between said ceramic crown and said piston main body wherein said interface is protected from exposure to an outside environment and said outermost side peripheral surface of said ceramic crown is arranged flush with outermost side surfaces of said piston main body and said annular member, thereby preventing entry of gases between said ceramic crown and said piston main body through said interface.

2. A ceramic cast-in bonded piston, comprising:
   a ceramic crown comprising a top surface and a bottom surface;
   an aluminum alloy piston main body cast-in bonded in contact with said bottom surface of said ceramic crown, and said piston main body having an annular notch formed in an upper surface thereof at an outermost side peripheral portion thereof; and
   at least one metal annular member friction welded to said bottom surface of said ceramic crown and occupying said annular notch of said piston main body to seal an interface between said ceramic crown and said piston main body wherein said interface is protected from exposure to an outside environment and said outermost side peripheral portion of said piston main body is arranged flush with an outermost side surface of said annular member, thereby preventing entry of gases between said ceramic crown and said piston main body through said interface.

* * * * *